United States Patent
Oohashi et al.

(10) Patent No.: US 6,501,207 B2
(45) Date of Patent: *Dec. 31, 2002

(54) ROTOR FOR A VEHICULAR A. C. GENERATOR

(75) Inventors: Atsushi Oohashi, Tokyo (JP); Yoshihito Asao, Tokyo (JP); Toshiaki Kashihara, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/439,079

(22) Filed: Nov. 12, 1999

(65) Prior Publication Data
US 2002/0047482 A1 Apr. 25, 2002

(30) Foreign Application Priority Data
May 27, 1999 (JP) .......................... 11-148679

(51) Int. Cl.⁷ ..................... H02K 13/02; H02K 3/46
(52) U.S. Cl. ............................ 310/263; 310/232
(58) Field of Search .................... 310/263, 71, 232

(56) References Cited

U.S. PATENT DOCUMENTS

| | | | |
|---|---|---|---|
| 4,565,936 A | 1/1986 | Ikegami et al. ............. | 310/263 |
| 5,773,906 A * | 6/1998 | Mukai et al. ............... | 310/232 |
| 5,886,451 A * | 3/1999 | Hatsios et al. ............. | 310/263 |
| 6,172,434 B1 * | 1/2001 | Oohashi et al. ............ | 310/71 |

FOREIGN PATENT DOCUMENTS

| | | | |
|---|---|---|---|
| JP | 59-204445 | * 11/1984 | .................. 310/263 |
| JP | 6-44296 | 11/1994 | |

* cited by examiner

Primary Examiner—Karl Tamai
(74) Attorney, Agent, or Firm—Sughrue Mion, PLLC

(57) ABSTRACT

The present invention is a rotor for a vehicle a.c. generator which increases the operational life of the a.c. generator. The rotor, in the present invention for a vehicular a.c. generator includes a bobbin having a rotor coil for generating a magnetic field wound thereon and including fixing portions for supporting lead wires of the rotor coil; a pair of rotor cores for sandwiching the rotor coil and the bobbin therebetween; slip rings having terminals to be connected to the lead wires; grooves formed in the rotor core for housing the lead wires, the lead wires extending between the fixing portions and the terminals; and a rear fan provided so as to cover the grooves. The fixing portion, the terminal and the groove for each of the lead wires are provided so as to be substantially aligned, and the groove has an inward portion near an inner periphery of the rotor formed in a greater width than an outward portion near an outer periphery of the rotor.

1 Claim, 6 Drawing Sheets

ROTOR FOR A VEHICULAR A. C. GENERATOR

BACKGROUND OF THE INVENTION

1. Field of the Invention

The present invention relates to an a.c. generator mounted on a vehicle, in particular, the present invention relates to portions of the generator for leading out both ends of a rotor coil.

2. Discussion of Background

FIGS. 5 through 8 show the structure and the problems of a conventional vehicular a.c. generator. FIG. 5 shows a cross-sectional view of the a.c. generator. FIG. 6 shows a perspective view of a rotor with a portion of a cooling fan cut away. FIG. 7 shows a detail view of a portion of the generator, where an end of a rotor coil is led out. FIG. 8 shows a schematic view to explain how vibration is applied to a rotor core. Referring to FIG. 5, reference numeral 1 designates a stator, which comprises a front bracket 2, a rear bracket 3 and a stator core 5 with a stator coil 4. Reference numeral 6 designates the rotor, which comprises a pair of rotor cores 7 and 8, the rotor coil 9 sandwiched between the rotor cores 7 and 8, and a rotary shaft 10. The rotary shaft 10 has a portion thereof near the front bracket 2 provided with a pulley 11 and a portion thereof near the rear bracket 3 provided with slip rings 12 for supplying an exciting current to the rotor coil 9. The rotor core 7 has a front fan 13 provided thereon, and the rotor core 8 has a rear fan 14 provided thereon.

On the rear bracket 3 are provided a brush holder 16 with brushes 15 in slidable contact with the slip rings 12, a rectifier 17 for rectifying an a.c. output from the stator coil 4, and a voltage regulator 18 for controlling the output voltage from the stator coil. In the rotor 6, the rotor cores 7 and 8 alternately provide magnetic poles 19 and 20 as shown in FIG. 6. The rotor coil 9 is wound on a bobbin 21 and sandwiched between the rotor cores 7 and 8 as shown in FIG. 5. The rotor coil 9 has lead wires 9a at its wind-start portion and its wind-completion portion. The respective lead wires are held by fixing portions 21a formed on the bobbin 21, extend into respective grooves 8a formed in the rotor core 8 so as to be electrically protected by insulating sleeves, are fixed at respective hooks 12a formed on the respective slip rings 12, and are connected to connecting terminals 12b by spot-welding or a similar technique.

Wiring of the lead wires 9a is carried out on an automatic machine. The automatic machine requires that the grooves 8a formed in the rotor core 8 be directed in a direction deviated from a radial direction from each of the fixing portions 21a toward the center of the rotary shaft 10. By this arrangement, the lead wires 9a, which are provided in the grooves 8a from the fixing portions 21a to the hooks 12a, are subjected to a centrifugal force in a bending direction. The grooves 8a have a resin filled on bottoms thereof to bond the lead wires 9a thereto so as to cope with the centrifugal force. As shown in FIG. 7, the lead wires extend in space and apart from the bottoms of the grooves 8a to be connected to the connecting terminals 12b at locations where the lead wires are fixed to the hooks 12a. In FIG. 6 is shown only one of both lead wires at the wind-start portion and at the wind-completion portion.

In the a.c. generator thus constructed, the stator coil 4 generates a.c. power when an exciting current is supplied to the rotor coil 9 through the brushes 15 and the slip rings 12 with the rotor 6 driven by an internal combustion engine. The rectifier 17 converts the a.c. power into d.c. power before outputting the power from the generator. The voltage regulator 18 regulates the exciting current to control the output voltage from the generator. Since the stator coil 4, the rectifier 17 and the voltage regulator 18 produce heat, the front fan 13 and the rear fan 14 provided on the rotor cores 7 and 8 introduce external air to constantly cool these devices in operation.

The conventional a.c. generator has a great speed increasing ratio with respect to the driving internal combustion engine since the generator can provide sufficient output even in a low revolution range. The conventional generator has recently reached a maximum at 18,000 RPM. Under the circumstances, the lead wires 9a, which are provided in a direction deviated from a radial direction starting at the center of revolution, are subjected to a great centrifugal force. Additionally, significant angular accelerations, that are caused by variations in the revolution of the internal combustion engine, are applied to the rotor 6. As a result, the lead wires 9a are subjected to a great stress. In addition, the rotor core 8 is subjected to vibrations caused by the electromagnetic attraction between the magnetic poles 20 of the rotor core 8 and the stator core 5 as shown in FIG. 8. The vibrations create a problem in that the resin, which has been filled in a groove 8a to bond the relevant lead wire 9a to the bottom thereof is exfoliated from the bottom of the groove 8a at an outer side of the rotor core 8.

In the case of a vehicular a.c. generator rated at 100 A as output for instance, the caloric value of the stator coil 4 is about 500 W at the maximum, and the caloric value of the rectifier 17 is about 120 W at the maximum. Although the front fan 13 supplies air to the stator coil 4 to cool the stator coil and the rear fan 14 also supplies air to the stator coil 4, the temperatures of the stator coil 4 and the rectifier 17 are raised to about 200° C. when the engine room is at a temperature of 100° C. The cooling air supplied by the rear fan 14 cools the rectifier 17 and the voltage regulator 18 as indicated in an arrow A in FIG. 5, and is heated by cooling the rectifier 17 and the voltage regulator 18. The heated air passes the outer side of the rotor core 8. Additionally, the rotor coil 9 produces heat at about 60 W. Under these circumstances, the lead wires 9a and the bonding resin in the grooves 8a in the outer side of the rotor core 8 are exposed to a high temperature, which can reach temperatures of up to 150° C. in some cases.

As explained, the lead wires 9a are subjected to high temperatures and the stresses caused by the vibrations and the centrifugal forces during operation. Such operating conditions are made even more severe because of demands to obtain high output from the generator and to operate the generator faster. This has created a problem in that the resin, which has been provided to bond the lead wires 9a to the bottoms of the grooves 8a, is deteriorated to cause separation of the resin from the bottoms of the grooves 8a, causing the lead wires to be cut off. In addition, the resin that has separated is flown by the centrifugal force in the generator. The flown resin could come between the stator core 5 and the rotor cores 7 and 8, damage the insulation of the stator coil 4 or another device, or damage a brush 15, which is an additional problem.

In order to cope with these problems, there has been proposed a technique as disclosed in JP-Y-644296. In this technique, a fan, which is provided on a rotor core, has an inner circumferential portion engaged with an outer circumferential portion of slip rings, lead wires of the rotor coil are surrounded by a slip ring and a barrier provided on the fan at a location to connect the lead wires to the slip rings, and an insulated material is filled in the space defined by the slip ring and the barrier for fixing of the lead wires. By this arrangement, even if the insulated material separates from the rotor core because of thermal deterioration or another factor, the centrifugal force can be received by the barrier provided on the fan to reduce the stress applied to the lead wires. However, this arrangement can not provide complete measures to avoid the disconnection between the resin and the rotor core since a thermal stress is applied to a connecting portion or the insulating material because of the presence of the difference of coefficients of thermal expansion between the insulated material and a metallic part, such as a surrounding barrier and a slip ring. In addition, this arrangement can not avoid adverse effects, such as problems caused by scattering of broken pieces of the insulated material in the generator, including a decrease in an air volume introduction area of the fan and an increase in mechanical unbalancing degree.

SUMMARY OF THE INVENTION

It is an object of the present invention to solve these problems, and to provide a rotor for a vehicular a.c. generator capable of decreasing stress caused by a centrifugal force applied to lead wires of a rotor coil to prevent a resin material from detaching and scattering, thereby avoiding disconnection of a lead wire so as to provide a high reliability.

The present invention provides a rotor for a vehicular a.c. generator, comprising a rotor coil for generating a magnetic field; a bobbin having the rotor coil wound thereon and including fixing portions for supporting lead wires for the rotor coil; a pair of rotor cores for sandwiching the rotor coil and the bobbin therebetween; a front fan and a rear fan provided on both outer ends of the rotor core; slip rings having terminals to be connected to the lead wires for supplying an exciting current to the rotor coil; and grooves formed in an outer side of the rotor core near the rear fan for housing the lead wires, the lead wires extending between the fixing portions and the terminals; wherein the fixing portion, the terminal and the groove for each of the lead wires are provided so as to be substantially aligned in a radial direction of the rotor, the groove has an inward portion near an inner periphery of the rotor formed in a greater width than an outward portion near an outer periphery of the rotor, the rear fan covers the groove except for a part of the inward portion thereof, and the groove has a resin material filled therein.

As explained, in accordance with the present invention, the lead wires are provided so as to be directed to a radial direction of the rotor, the grooves for housing the lead wires are formed so as to have the inward portion formed in a greater width than the outward portion, and the resin material which is filled in the grooves to fix the lead wires is held between the rear fan and each of the grooves. This arrangement can decrease a stress caused by a centrifugal force to avoid disconnection of a lead wire or prevent a resin material from detaching, or being broken and scattered, thereby to provide a highly reliable rotor for a vehicular a.c. generator, which can cope with requirements of high revolution and high power.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
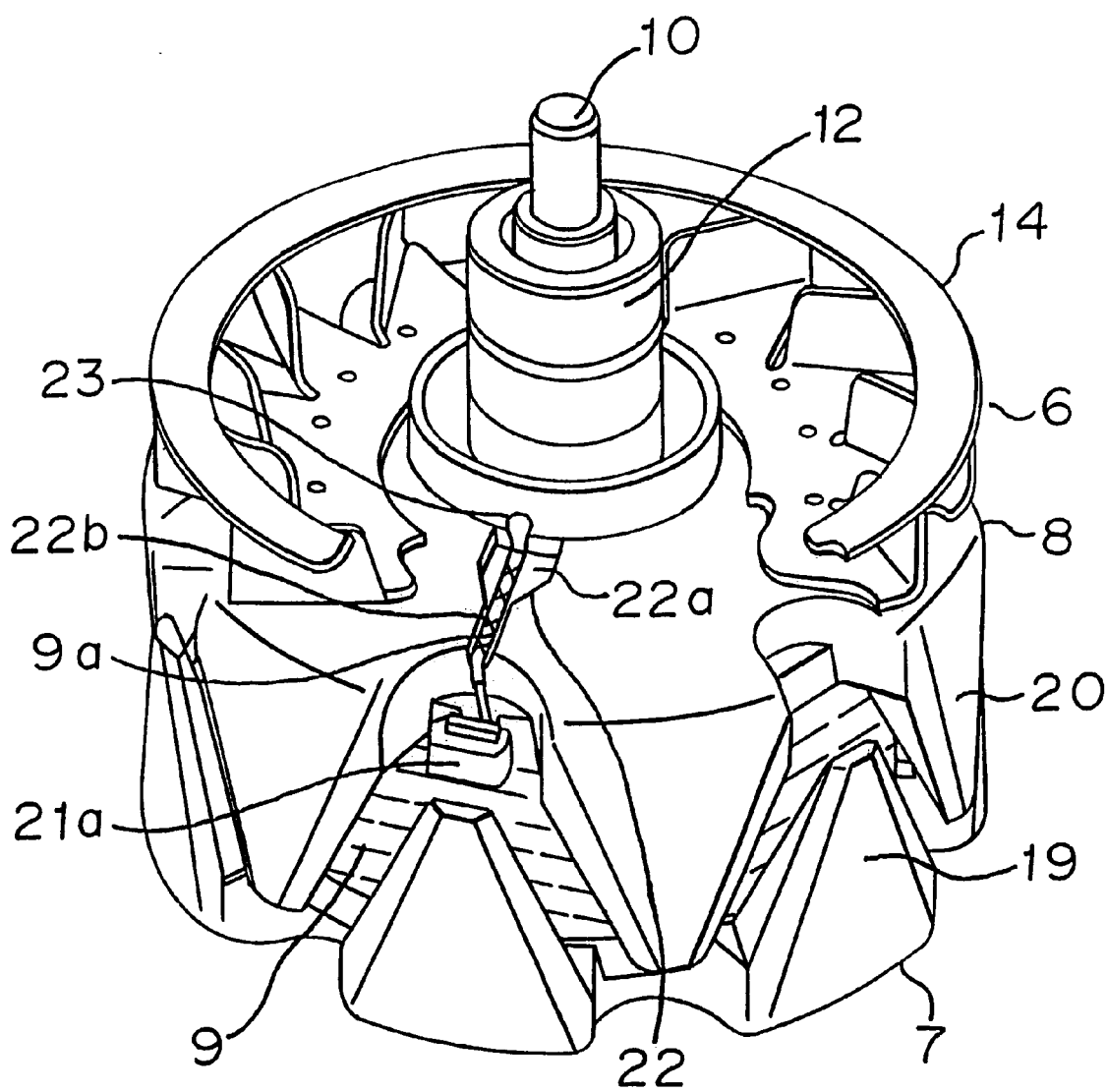
FIG. 1 is a perspective view of the rotor for a vehicular a.c. generator according to an embodiment of the present invention.
Figure 2:
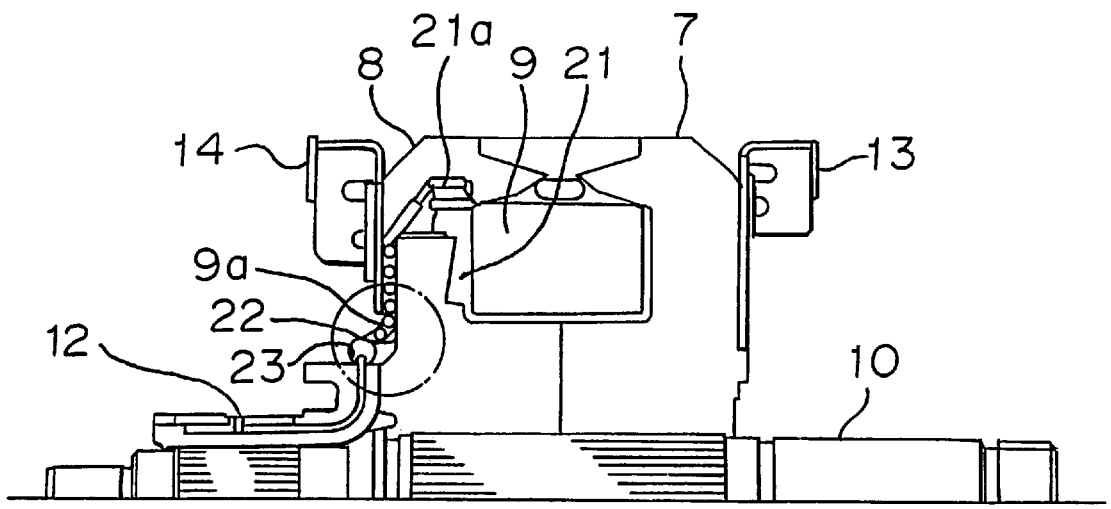
FIG. 2 is a cross-sectional view of a half portion of the rotor.
Figure 3:
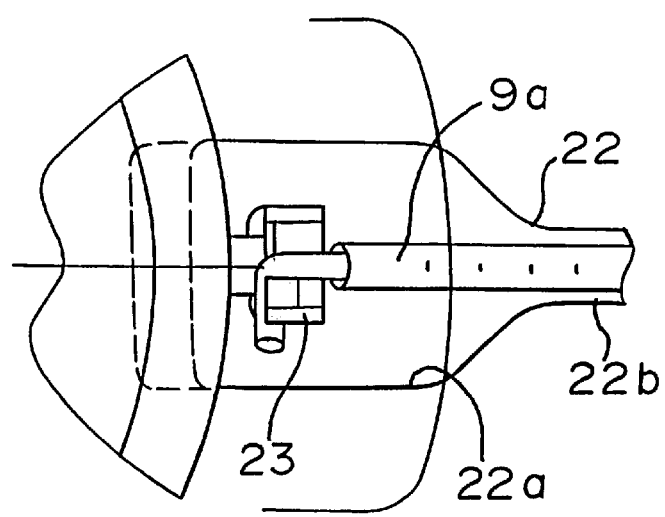
FIG. 3 is a detail view to explain how a lead wire is provided in accordance with the embodiment.
Figure 4:
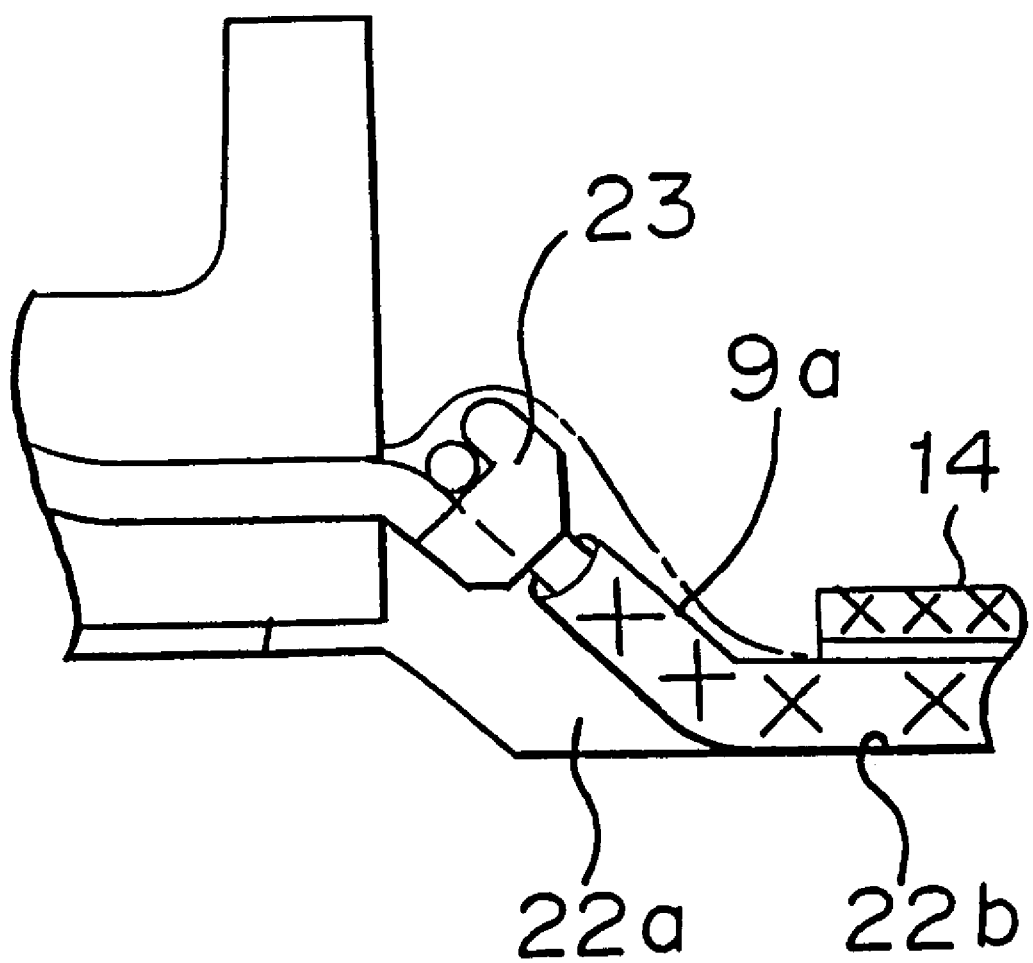
FIG. 4 is a detail view to explain how the lead wire is provided in accordance with the embodiment.
Figure 5:
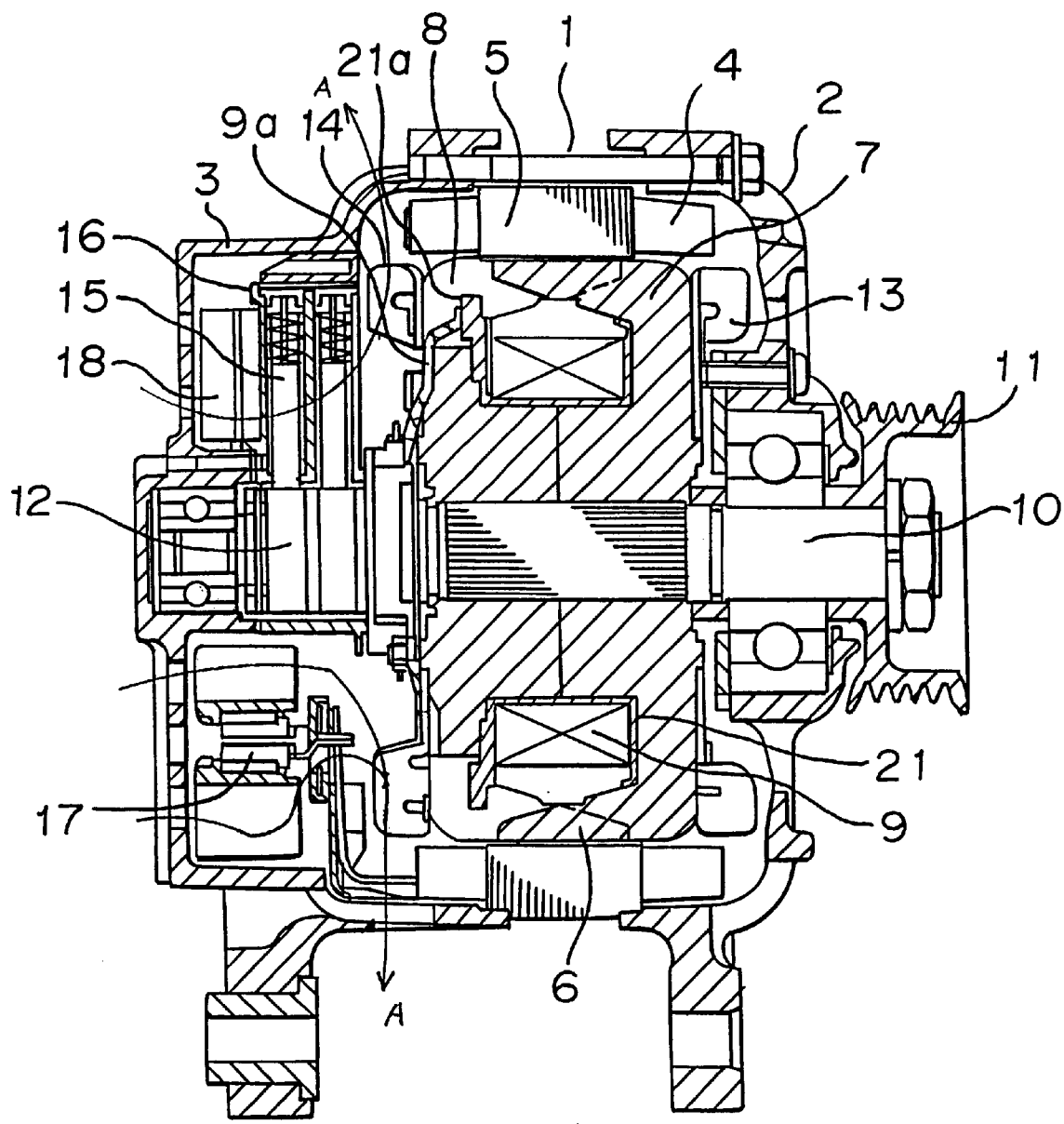
FIG. 5 is a cross-sectional view of a conventional vehicular a.c. generator.
Figure 6:
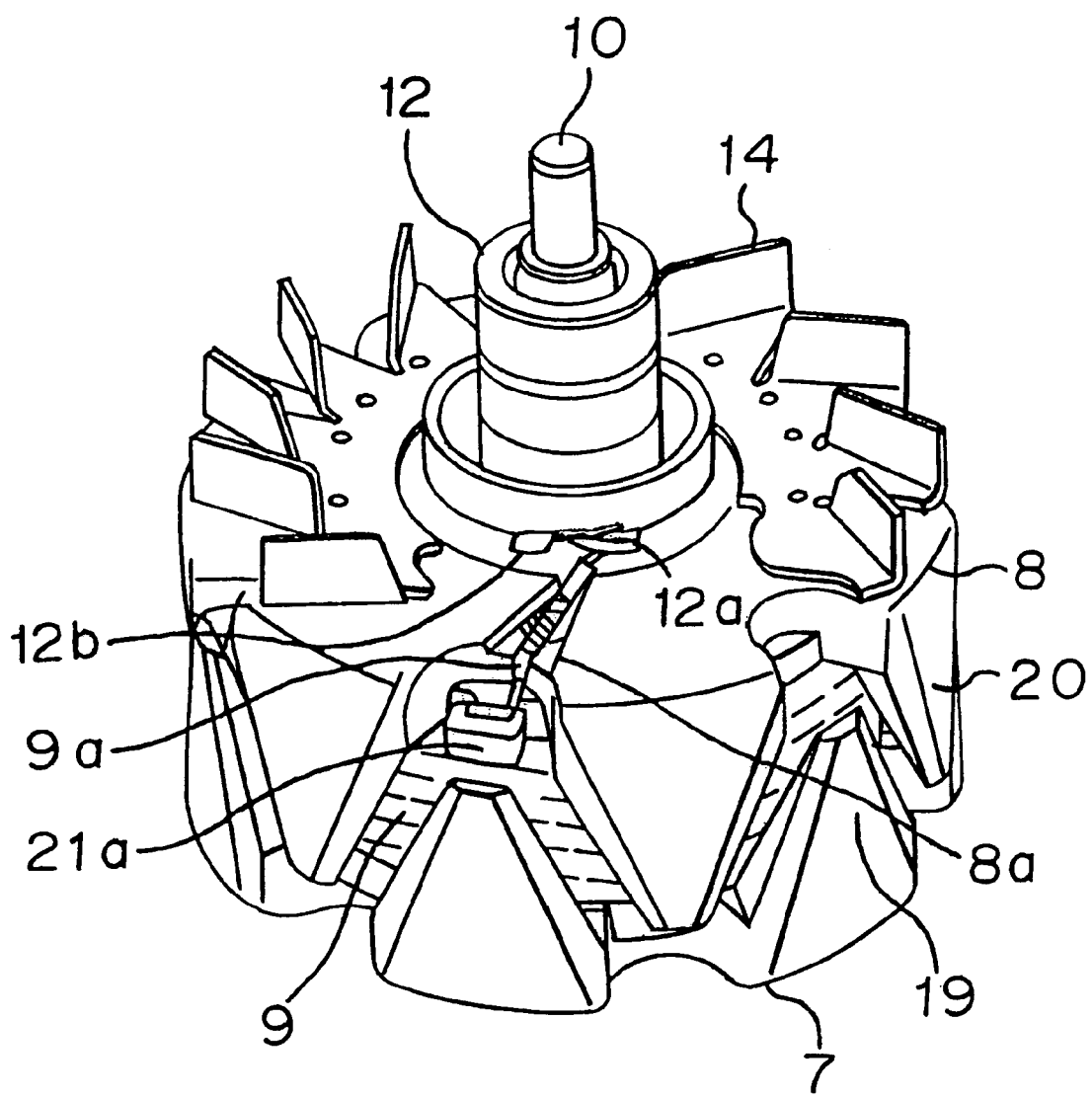
FIG. 6 is a perspective view of the rotor in the conventional vehicle a.c. generator.
Figure 7:
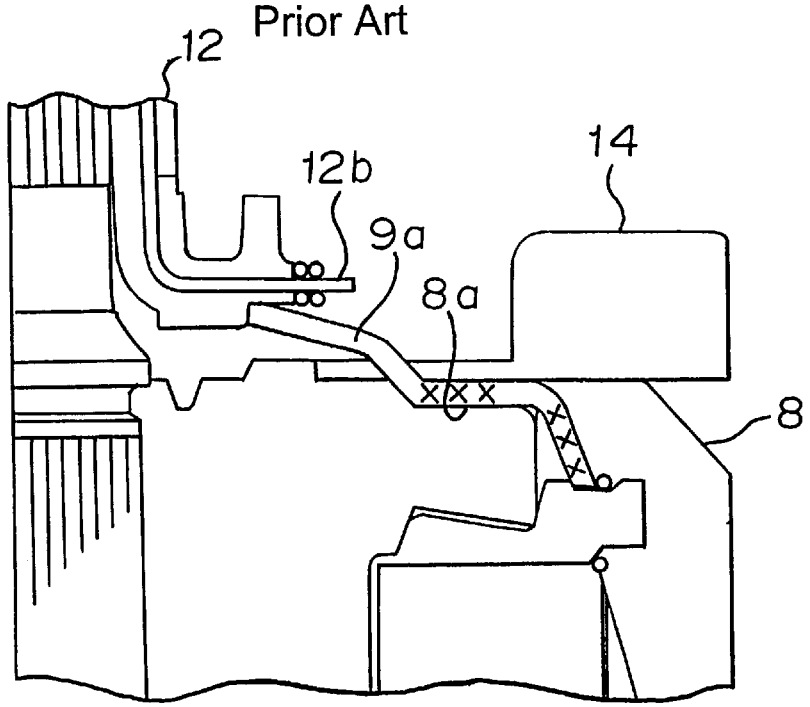
FIG. 7 is a detail view to explain how a lead wire is provided in the conventional generator.

FIGS. 1 through 4 show the arrangement of the rotor for a vehicular a.c. generator according to an embodiment of the present invention. FIG. 1 shows a perspective view of a rotor with a portion of a fan cut away. FIG. 2 shows a cross-sectional view of a half portion of the rotor, the rotor being shown to be cut at one of lead wires of a rotor coil. FIGS. 3 and 4 show detail views of a portion of the rotor, where the one lead wire is connected to a slip ring. In these Figures, parts identical or similar to the parts in the conventional generator are indicated by the same reference numbers. In these Figures, reference numeral 6 designates the rotor, which comprises rotor cores 7 and 8, the rotor coil 9 for generating a magnetic field, and a rotary shaft 10. The rotor core 7 has a front fan 13 provided thereon by spot-welding or another technique, and the rotor core 8 has a rear fan 14 provided thereon by spot-welding or another technique. The rotor cores 7 and 8 alternately provide magnetic poles 19 and 20 for generating the magnetic field.

The rotor coil 9 is wound on a bobbin 21 and is fixedly sandwiched between the rotor cores 7 and 8. The rotor coil 9 has respective lead wires 9a at a wind-start portion and at a wind-completion portion thereof. The respective lead wires are fixed to fixing portions 21a of the bobbin 21. The lead wires extend in grooves 22 formed in the rotor core 8, being electrically protected by insulating sleeves. The lead wires are connected to terminals 23 provided on the slip rings 12. Each of the fixing portions 21a and each of the terminals 23 are provided so as to be substantially aligned in a radial direction from the center of revolution of the rotary shaft 10. Each of the grooves 22 are provided so as to be substantially aligned with the related fixing portion and terminal in the same radial direction. Each of the grooves is formed so as to provide a narrow slit portion 22b at a location near the related fixing portion 21a, or an outer periphery of the rotor core 8, and to provide a wide resin filling portion 22a at a location near an inner periphery of the rotor core 8. The resin filling portion is wider than the slit portion.

Each of the lead wires 9a is held by the related fixing portion 21a on the bobbin 21 as stated earlier, and each of the lead wires is accommodated in the related groove 22 and extends to the related terminal 23 of the related slip ring 12. The rear fan 14 covers the grooves 22 except for portions of the resin filing portions 22a near the inner periphery of the rotor to hold the lead wires 9a in the grooves 22. Each of the lead wires is led out at a location near the related terminal 23, being directed to the radial direction. Each of the lead wires has an L-character shaped leading edge fixedly engaged with the related terminal 23, and electrically and mechanically connected to the related terminal by spot-welding or another technique. Then, a resin is filled in the grooves 22 from the resin filling portions 22a until the resin occupies portions between the bottoms of the grooves 22 and the rear fan 14 to fix the lead wires 9a and the resin per se between the grooves 22 and the rear fan 14. As shown in FIG. 4, the resin is filled even at locations that the lead wires 9a are connected to the terminal 23. The resin also enters the insulating sleeves for covering the lead wires 9a, hardening the outer coverings of the lead wires 9a.

Figure 8:
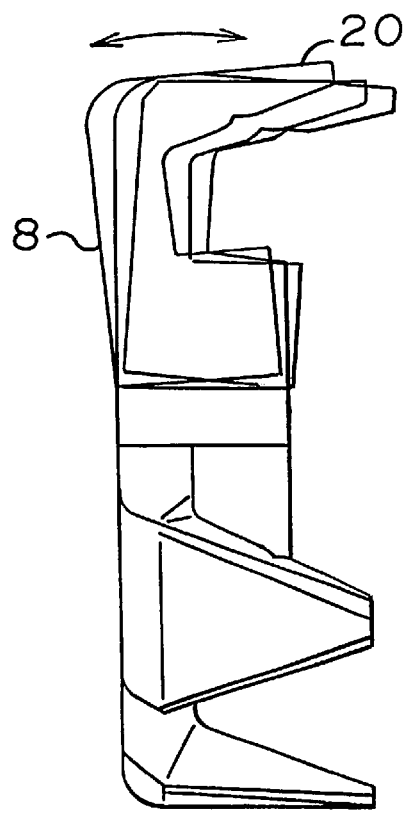
FIG. 8 is a schematic view to explain how vibration applied to the rotor core in the generator.

As explained, in accordance with the rotor of the embodiment, the respective grooves 22 to accommodate the respective lead wires 9a have respective inward portions near the inner periphery of the rotor formed in a greater width than outward portions near the outer periphery of the rotor, allowing the respective grooves 22 to receive at side walls thereof a centrifugal force applied to the resin filled in the grooves. Even if the rotor core 8 is subjected to displacement by vibrations as shown in FIG. 8, the resin can not separate since the resin is filled and held between the rear fan 14 and the bottoms of the grooves 22. Each of the lead wires 9a can be provided in the radial direction in the related groove 22 formed in the rotor core 8 to prevent a centrifugal force from causing a bending stress. Since the portions of the lead wires 9a that are led out from the resin filling portions 22a to the terminals 23 are provided in the respective radial directions, the length of those portions can be shortened. In addition, the resin hardens these portions to minimize a stress, which is applied to these portions by the centrifugal force.

The resin, which is held between the rear fan 14 and the bottoms of the grooves 22 as stated earlier, can be prevented from being broken and scattered by a centrifugal force, thus providing an adverse effect. A test was carried out on a vehicular a.c. generator with the rotor according to the embodiment by increasing and decreasing the revolution between 0 RPM and 18,000 RPM at ambient temperature of 100° C. The test showed that the generator withstood an operation of about 800 hours. When a test was carried out on a vehicular a.c. generator with the conventional rotor under the same conditions, the test showed that disconnection occurred in about 150 hours. This means that the rotor according to the embodiment is significantly superior to the conventional rotor.

Obviously, numerous modifications and variations of the present invention are possible in light of the above teachings. It is therefore to be understood that within the scope of the appended claims, the invention may be practiced otherwise than as specifically described herein.

What is claimed is:

1. A rotor for a vehicular a.c. generator, comprising:

a rotor coil for generating a magnetic field;

a bobbin having the rotor coil wound thereon and including fixing portions for supporting lead wires for the rotor coil;

a pair of rotor cores for sandwiching the rotor coil and the bobbin therebetween;

a front fan and a rear fan provided on both outer ends of the rotor core;

slip rings having terminals to be connected to the lead wires for supplying an exciting current to the rotor coil; and grooves formed in an outer side surface of the rotor core near the rear fan for directly housing the lead wires such that the lead wires are in the grooves, the lead wires extending between the fixing portions and the terminals;

wherein the fixing portion, the terminal and the groove for each of the lead wires are provided so as to be substantially aligned in a radial direction of the rotor, the groove has an inward portion near an inner periphery of the rotor formed in a greater width than an outward portion near an outer periphery of the rotor, the rear fan covers the groove except for a part of the inward portion thereof, and the groove has a resin material filled therein.

* * * * *